J. R. RANKIN & W. W. BOUGHTON.
FLUME.
APPLICATION FILED MAR. 3, 1913. RENEWED MAR. 16, 1914.

1,183,906.

Patented May 23, 1916.

WITNESSES:

INVENTORS
John R. Rankin
Walter W. Boughton

UNITED STATES PATENT OFFICE.

JOHN R. RANKIN AND WALTER W. BOUGHTON, OF PUEBLO, COLORADO; SAID BOUGHTON ASSIGNOR TO SAID RANKIN.

FLUME.

1,183,906. Specification of Letters Patent. Patented May 23, 1916.

Application filed March 3, 1913, Serial No. 751,876. Renewed March 16, 1914. Serial No. 825,162.

*To all whom it may concern:*

Be it known that we, JOHN R. RANKIN and WALTER W. BOUGHTON, citizens of the United States, and residents of Pueblo, in the county of Pueblo and State of Colorado, have invented a certain new and useful Improvement in Flumes, of which the following is a full, clear, and exact description.

This invention is an improvement in flumes which are employed to convey water for power, irrigation or other purposes and relates in particular to the means of forming the joints between the sections of which such flumes are built.

The principal objects of our invention are: To provide a flume joint which has a smooth interior and consequently a low coefficient of friction; to provide a joint which can be made water tight without the use of rivets or solder; to provide a joint obviating severe or abrupt bends of the galvanized metal of which such sections are usually composed, thus avoiding cracking of the coating of the metal; to provide a joint having means distributed at suitable distances for pulling the parts together, thus obviating the trouble caused by the interior or compression member buckling, which now frequently happens particularly in large flumes; and to provide a joint with which the use of "shoes" is not necessary and which will be water tight to the top of the flume.

Other objects and advantages of our invention will later appear in the specification and be pointed out in the appended claims.

Figure 1:
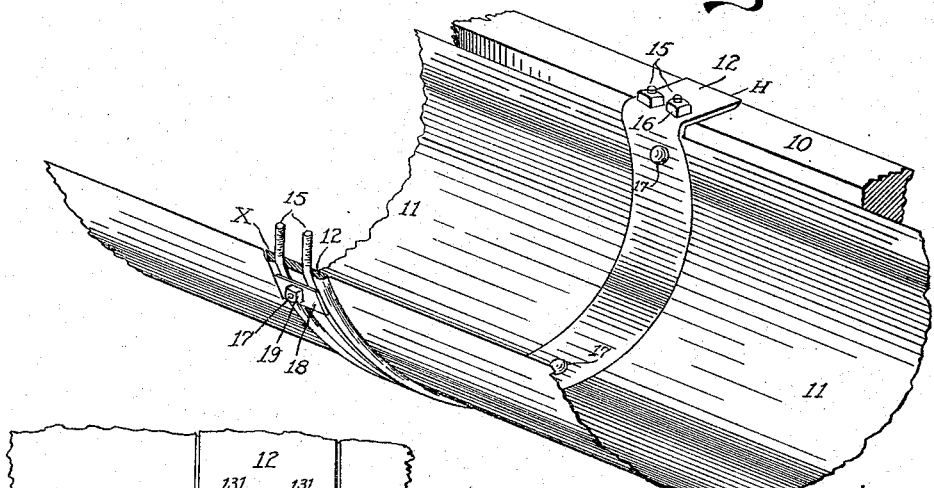
Figure 2:
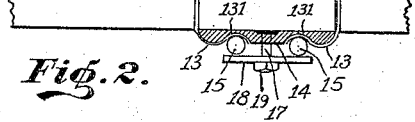
Figure 4:
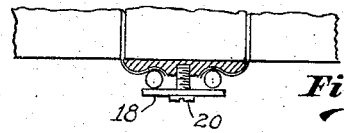
Figure 3:
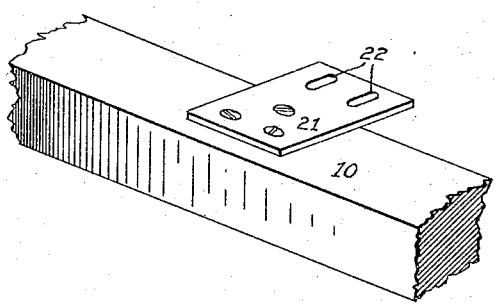

To these ends our invention consists in the means and combinations of parts shown in the accompanying single sheet of drawings in which:

Figure 1 is a perspective showing portions of two adjacent flume sections and the joining means for the sections, the "inside shape" being cut off on the left hand side at X to more clearly show certain of the parts; Fig. 2 is an enlarged plan view of the joint as it appears at X of Fig. 1, the inside shape again being in section; Fig. 3 is a perspective of a plate used with another form of joint where the bent out horizontal shoulder of the inside shape is dispensed with; and Fig. 4 is a view similar to Fig. 2 but showing a slightly modified form of securing bolt for the retaining plate.

In the drawings 10, 10, indicate the stringers on which the flume is supported, and 11, 11, the separate, semi-cylindrical sections of metal, preferably galvanized iron, of which the flume is composed. These sections 11, 11, are formed at each end with a pair of corrugations or beads 13, 131; the corrugation 13 being the deeper and convex outwardly from the flume while the corrugation 131 is shallower and is curved in the reverse direction. In our form of joint the sections 11 do not overlap or even abut but are separated by an "inside shape" 12, the outer surface of which is curved as shown to fit the S-shaped extremities of the plates 11 and to provide a shoulder 14 for separating the ends of the plates, and the inner face of which is smooth and adapted to coincide with the inner face of the flume. Rods 15, threaded at their ends, pass through slotted bolt holes in horizontal portions H of the inside shape 12 and nuts 16 on the ends of the rods tend to force them toward the inside shape and bind the plates 11 between the rods and the inside shape.

At suitable distances around the flume we provide additional means for tying the joining elements one to another. In the present instance three of these elements are illustrated though we do not confine ourselves to this number as on very large flumes a larger number could very well be employed and on very small flumes a less number will be found to be ample. These means are provided to obviate a difficulty which has been found to be inherent in the type of flumes now being made and particularly in the larger sizes of these flumes. The interior of the joining members being in compression there is a great tendency for them to buckle, particularly if the parts are not fitted absolutely true, and, after a part has once failed in this way, it can not be used again even if straightened for the metal has been so weakened that when stress is again placed upon it, it will again fail. This tendency to buckle can only be neutralized by providing means which exert stress on the inside members in a direction opposite to that in which there is a tendency for them to be displaced.

In designing flumes it is customary to allow a certain "free-board" which is, for all sizes in the best practice, substantially one tenth of the depth of the flume. This free-board is that part of the flume to which the water should not be allowed to rise and it is below the high water line established by the lower edge of the free-board that we locate our means for connecting the clamping members; therefore these connecting means must be water tight. In order to accomplish this and at the same time maintain the interior of the flume entirely without obstruction and the flow of the water uninterfered with we have provided a flume structure in which the sections do not overlap or meet and in which an interior joining member provides a shoulder which closes the space between the sections.

In the form shown in Figs. 1 and 2 a countersunk bolt 17 passes through the shoulder 14 and carries a plate 18 which extends over the rods 15 in such position as to bear on the rods. A nut 19 on the bolt 17 tends to force the plate 18 against the rods and the tension placed on the bolt 17 tends to hold the inside shape 12 against displacement. Three of these bolts 17 are indicated in Fig. 1 and we have found this number ample for ordinary sized flumes but more could equally well be employed if found desirable. The holes for the bolts being in a part which does not need to be matched with others there is no trouble about fitting and the bolts being countersunk there is nothing to protrude into the flume to form a lodging place for debris. We have found that it is not difficult to make a water tight joint around the bolts even though a hole has been made entirely through the member 12. If, however, it is desired that there be no perforation whatever within the water lines of the flume, the modification shown in Fig. 4, where a lag-screw 20 is substituted for the bolt 17, may be employed.

In the modification of Fig. 3 a plate 21 secured to the stringer 10 forms an abutment for the upper end of the member 12 and permits of doing away with the horizontally bent portion H of the inside shape. Slots 22 permit of the passage of rods 15 and of their being moved over to final location as the parts are forced home and the nuts 16 and 19 tightened.

The form shown in Fig. 3 is particularly easy of assembling—the rods 15 being first passed through the slots 22 and the nuts 16 started; then the plates 11 are laid in place and the inner shape placed on the plates or sections; the plates 18 are then put on the bolts 17 and the nuts 19 tightened until the parts take their position but the rods are not grasped so tightly as to prevent movement. Then the nuts 16 and 19 are alternately tightened until the structure assumes its final shape. The advantage of having flume sections which do not overlap and of providing means which will loosely grasp the parts at various points across the flume and prevent their relative displacement during the tightening operation, will be evident to those familiar with the difficulties experienced in assembling the flumes now on the market.

In almost all forms of commercial flumes as now produced a "shoe" having inclined bearing surfaces is employed to force the inner and outer clamping members toward one another near the top of the flume. These shoes, however, fail to bring the parts so intimately together as to prevent leakage near the tops and the flumes can seldom be run to capacity. With our form of joining means, however, the sections and joining means may be drawn as tightly together as desired even at the very top and there need be no place on the flume which is not water tight; a larger discharge from the same size of flume may therefore be had.

We do not desire to limit ourselves to the particular form of corrugations or beads placed on the ends of the sections and the corresponding shape given to the member 12. The curve 13 may be of any shape which is adapted to form a recess to receive the member 12 and likewise 131 may be of any shape adapted to give the rods 15 a grip thereon and we wish the term "bead" as employed in the claims to be given an interpretation in keeping with this paragraph. We have found, however, the combination of curves shown to be well adapted to the purposes as they are very easy and there is therefore little tendency to crack the galvanizing.

Having thus described our invention what we claim and desire to secure by Letters Patent is:

1. In a device of the class described, the combination with two adjoining sections having beads at their ends, of an interior joining means having two spaced sockets for receiving said beads and means for securing said beads in said sockets, and holding the sections out of contact one with another.

2. In a device of the class described, the combination with two adjoining sections having beads at their ends, of an interior joining means having two spaced sockets for receiving said beads and holding the sections out of contact one with another, the joining means being so shaped as to give a smooth surface to the interior of the assembled device, and means for securing said beads in said socket.

3. In a device of the class described, the combination with two adjoining sections having beads at their ends, of an interior joining means having two spaced sockets for receiving said beads and holding the sections out of contact one with another, and means on the exterior of the device supported on the joining means and between the ends of the sections for forcing the sections into contact with the joining means.

4. In a flume, the combination of two adjoining sections having double beads at their ends, the inner of said beads being convex outwardly and the outer of said beads having a curvature in the opposite direction, of a joining means adapted to fill the inner beads and having sockets to receive the outer, the inner surface of said joining means lying in the same curved surface as the interior of the flume, and means for holding said sections in contact with said joining means.

5. In a flume, the combination of two adjoining sections having double beads at their ends, the inner of said beads being the deeper and convex outwardly and the outer of said beads having a curvature in the opposite direction, of a joining means adapted to fill the inner beads and having spaced sockets to receive the outer, the joining means being so shaped as to give a smooth surface to the interior of the assembled device, and means for holding said sections in contact with said joining means.

6. In a flume, the combination of two adjoining sections having double beads at their ends, the inner of said beads being convex outwardly and the outer of said beads having a curvature in the opposite direction, of an inner shape adapted to fill the inner beads and having sockets to receive the outer, and rods mounted in position to force the outer beads into the sockets.

7. In a flume, the combination with two adjoining sections having beads at their ends, of an interior joining means having two spaced sockets for receiving said beads, rods for holding the beads in the sockets, and means engaging the rods intermediate their ends for forcing them to place.

8. In a flume, the combination with two adjoining sections having beads at their ends, of an interior joining means having two spaced sockets for receiving said beads, rods for holding the beads in the sockets, and means reacting on the interior joining means and engaging the rods intermediate their ends for forcing them to place.

9. In a flume, the combination with two adjoining sections having beads at their ends, of an interior joining means having two spaced sockets for receiving said beads and a shoulder intermediate said sockets, rods for forcing the beads into the sockets, a bolt carried by said shoulder and a plate on said bolt in position to engage the rods.

10. In a flume, the combination with two adjoining sections having beads at their ends, of an interior joining means having two spaced sockets for receiving said beads and a shoulder intermediate said sockets, rods for forcing the beads into the sockets, a plurality of bolts carried by said shoulder and located at different points in the circumference of the flume, and plates on said bolts in position to engage the rods.

In testimony whereof, we hereunto affix our signatures in the presence of two witnesses.

JOHN R. RANKIN.
WALTER W. BOUGHTON.

Witnesses:
CHARLES W. O'DONNELL,
CHAS. H. WILLIAMS.

It is hereby certified that in Letters Patent No. 1,183,906, granted May 23, 1916, upon the application of John R. Rankin and Walter W. Boughton, of Pueblo, Colorado, for an improvement in "Flumes," errors appear in the printed specification requiring correction as follows: Page 2, line 108, claim 1, after the word "beads" insert the words *and holding the sections out of contact one with another;* same page and claim, line 109, beginning with the words "and holding" strike out all to the end of the claim; same page, line 120, claim 2, for the word "socket" read *sockets;* and that the said Letters Patent should be read with these corrections therein that the same may conform to the record of the case in the Patent Office.

Signed and sealed this 18th day of July, A. D., 1916.

[SEAL.]

R. F. WHITEHEAD,

*Acting Commissioner of Patents.*

Cl. 61—5.